(12) United States Patent
Klein et al.

(10) Patent No.: US 6,463,496 B1
(45) Date of Patent: Oct. 8, 2002

(54) INTERFACE FOR AN I²C BUS

(75) Inventors: Wolfgang Klein, Rheinstetten; Martin Burger, Oberderdingen; Philipp Eidner, Bretten; Gunther Rentschler, Muenzesheim, all of (DE)

(73) Assignee: Richard Wolf GmbH, Knittlingen (DE)

( * ) Notice: Subject to any disclaimer, the term of this patent is extended or adjusted under 35 U.S.C. 154(b) by 0 days.

(21) Appl. No.: 09/339,648

(22) Filed: Jun. 24, 1999

(30) Foreign Application Priority Data

Jul. 27, 1998 (DE) .......................................... 198 33 693

(51) Int. Cl.⁷ .............................................. G06F 13/36
(52) U.S. Cl. ...................................... 710/305; 710/106
(58) Field of Search ................................ 710/305, 306, 710/313, 314, 105, 106, 315

(56) References Cited

U.S. PATENT DOCUMENTS

| | | | | |
|---|---|---|---|---|
| 5,311,300 A | * | 5/1994 | Blankevoort et al. | 348/690 |
| 5,664,218 A | * | 9/1997 | Kim et al. | 710/1 |
| 5,689,196 A | * | 11/1997 | Schutte | 326/86 |
| 6,247,083 B1 | * | 6/2001 | Hake et al. | 710/107 |
| 6,286,073 B1 | * | 9/2001 | Vegter | 710/129 |

FOREIGN PATENT DOCUMENTS

EP     0 759 593 A2    2/1997

OTHER PUBLICATIONS

Szilvassy, Laszlo, "I²C–Bus verbindet Mikro– und Mini–computer", Elektronik vol. 23, pp. 91–94, Nov. 16, 1984.
Färber, Georg, *Bussysteme*, 2. Auflage, München Wien: R. Oldenburg Verlag, "4.3.3 Elektrische Ankopplung", pp. 101–105, (1987).

* cited by examiner

*Primary Examiner*—Peter Wong
*Assistant Examiner*—Xuong Chung-Trans
(74) *Attorney, Agent, or Firm*—Akin, Gump, Strauss, Hauer & Feld, L.L.P.

(57) ABSTRACT

The interface circuit serves for connecting two apparatus by way of a bidirectional bus which comprises a data lead for transmitting data and a cycle lead for transmitting a cycle signal. The interface circuit consists of a circuit arrangement provided at each apparatus, which comprises a separating means for separating the data signal on the data lead and the cylce signal on the cycle lead in each case into a transmitting and a receiving branch, and which furthermore comprises in each case for the data lead and the cylce lead a bus driver having a differential transmitter and receiver. The data signals and cylce signals between the apparatus are transmitted via differential leads.

3 Claims, 1 Drawing Sheet

INTERFACE FOR AN I²C BUS

BACKGROUND OF THE INVENTION

Figure 1:
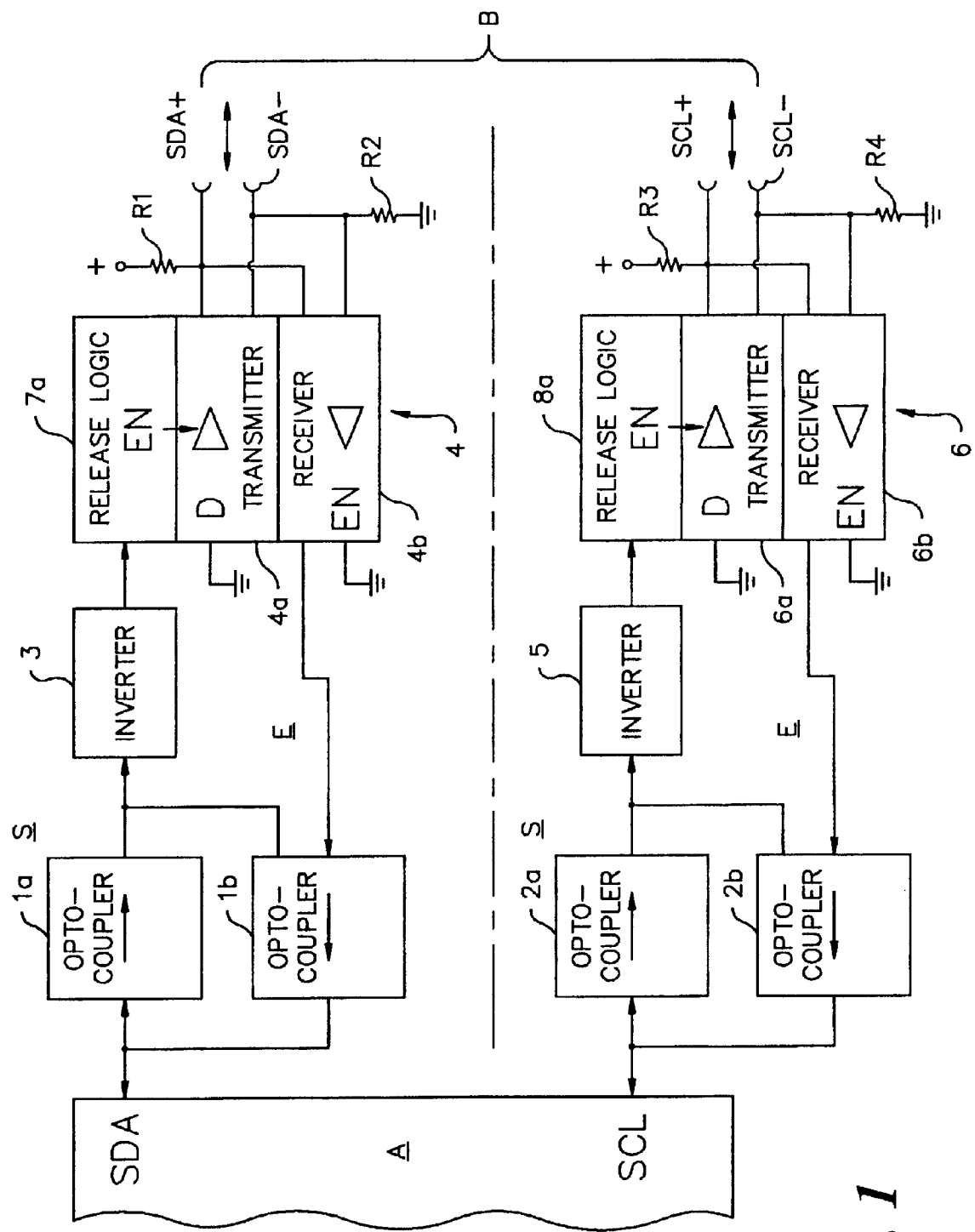

The invention relates to an interface circuit for connecting a first apparatus to at least one second apparatus distant thereto by way of a bi-directional bus, in particular an I²C bus which comprises a data lead for the bi-directional transmission of data and a cycle lead for the bi-directional transmission of a cycle signal.

Such an interface circuit is known from EP 0 759 593 A2. The known interface circuit serves for transmitting the data of an apparatus controlled via an I²C bus to a computer and reverse via a so-called RS232 interface. The data transfer is made by way of three control leads, wherein the one lead frees the other lead in its logic condition "0" and blocks it in its logic condition "1". In this manner data may be transmitted from the computer to the controlled apparatus in "bits" and the controlled apparatus may be cycled.

Generally with the I²C bus, which consists of two leads SDA and SCL transmitting data and cycle signals in both directions, no error recognition mechanisms with respect to hardware are present. The recognition, and where appropriate alleviation, of transmission errors may only be realized through software (cf. the publication of "The I²C bus" of Ludwig Brackmann in ELRAD 1991, booklet 5, pages 44–47). The mentioned publication also specifies that the I²C bus serves as the communication link between the integrated circuits of a circuit board or between several circuit boards of an apparatus. In this application the I²C offers advantages with respect to the small surface area occupied on the circuit board, low operative costs and high reliability.

With medical applications there is often the requirement to exchange data or control commands between apparatuses distanced from one another. This is, for example, the case with a TEM insufflation system (TEM-transanal endoscopic microsurgery) subdivided into two apparatuses. The known apparatuses in the application must be connected to one another and be able to mutually receive and transmit information. With these types of medical applications it is extraordinarily important that all data and control commands are transmitted in an undisturbed and genuine manner. Since the apparatuses are to be as small and as inexpensive as possible, there is therefore no opportunity for software solutions for the recognition or alleviation of transmission errors. Such transmission errors may not only occur by electric coupling in the leads from the outside but also by potential differences between the apparatuses. Security against malfunctioning implemented through software, if it could successfully be carried out at all, would have too great of an expense.

BRIEF SUMMARY OF THE INVENTION

Against this setting of the problem, it is the object of the invention to so form the interaction of apparatuses which are controlled by an I²C bus and which are distanced from one another, such that in a physical way malfunctioning of the data exchange is ruled out.

According to the invention such a solution is effected in that the data signal SDA and the cycle signal SCL of the I²C bus, before reaching the transmitter/receiver component and the transmission leads to the distanced apparatus, in each case are separated into a transmitting branch and a receiving branch and that, via a differential transmitter/receiver component, the signals are transmitted between the apparatuses via differential collection leads.

At the differential transmission leads there are thus present identical signals which are, however, opposite in their polarity so that, based on a difference formation between the signals, potential data errors are eliminated. The transmitter/receiver components are terminated with characteristic impedance of the transmission leads in a manner free of reflection, by which means longer connection leads of several meters to a few kilometers may also be used.

The separation in each case into a transmitting and receiving branch is advantageously carried out by two Opto-couplers which are decoupled from one another via fast diodes and which at the same time also achieve a galvanic separation of the apparatuses communicating with one another.

These Opto-couplers are thus connected between the apparatus to which the interface is allocated and the differential bus driver. After the Opto-coupler, the now occurring signal is inputted to the differential bus driver (i.e. the transmitter/receiver component). The receiver of the differential bus driver is switched such that it always monitors the signals on the I²C bus. The transmitter, however, is by way of logic circuitry only activated when a '0' is transmitted.

Of course, provided with the interface circuit according to the invention, not only two but more than two apparatuses may communicate with one another. Each apparatus must have the same interface (circuit arrangement). The multimaster capability and the transmission frequency of the I²C remain intact.

BRIEF DESCRIPTION SEVERAL VIEWS OF THE DRAWING

The invention is described in more detail by way of a block diagram (FIG. 1) of a preferred embodiment of the interface circuit according to the invention.

The interface circuit represented in FIG. 1 relates to the external connection of two apparatuses A and B by way of an I²C bus. The manner of functioning, the construction and the protocol of the I²C bus are assumed to be known (cf. e.g. the previously mentioned technical article "The I²C bus" by Ludwig Brackmann).

The interface circuit comprises a circuit arrangement allocated to each apparatus. The represented circuit arrangement is allocated to a first apparatus A symbolically represented on the left side of FIG. 1. The interface circuit, via data lead SDA, receives data from the first apparatus A and transmits data to the second apparatus B. In a similar manner the circuit arrangement receives data from the distanced apparatus B and sends this data to the first apparatus A. The interface circuit also receives/transmits cycle signals from/to the first apparatus A via the cycle lead SCL.

The represented interface circuit is incorporated into a TEM insulation system. The first apparatus A is a Laparo-Pneu and the second apparatus is a TEM pump. With TEM it is specifically necessary to unfold the rectum with $CO_2$ gas and, when required, to rinse it. The TEM pump and the Laparo-Pneu of this application must be connected to one another and be able to mutually receive and transmit information. With this application it is particularly important that the data to be transferred is transmitted in as undisturbed and genuine a manner as possible. Since, as already mentioned, the I²C bus in itself does not provide any error recognition mechanism with regard to hardware, the interface circuit according to the invention provides physical (i.e. circuit) means which are able to practically exclude disturbances in the data exchange occurring on the transmission path.

The interface circuit for each apparatus A, B comprises identical circuit arrangements, of which that belonging to apparatus A is shown in FIG. 1. For the data lead SDA and the cycle lead SCL there is provided a separating means consisting of Opto-couplers 1a, 1b, 2a, 2b, which separate the data and cycle signals of the I²C bus in each case into a transmitting branch S and a receiving branch E. The Opto-couplers 1a, 1b and 2a, 2b used for this separation simultaneously carry out a galvanic separation between the first apparatus A and the second apparatus B. By way of this measure, possible disturbances because of diverting currents or differences in potential are eliminated.

The Opto-couplers 1b, 2b of the receiving branches E are only active when the Opto-coupler 1a and 2a is inactive (i.e., SDA is not sending a "0" to the differential transmitter) and a "0" is received by the differential receiver and input to the Opto-coupler 1b, 2b in the corresponding receiving branch E. It must also be prevented that the respective Opto-coupler 1b, 2b in the receiving branches E does not simultaneously couple back a transmitted "0" at the SDA input to the apparatus A, since otherwise a self-blocking would arise. The Opto-couplers 1a, 1b and 2a, 2b of the transmitting and receiving branches S and E are decoupled from one another by fast diodes, which, however, are not shown in the circuit diagram of the FIG. 1. The data signals SDA from/to the Opto-couplers 1a, 1b (i.e. the data signals SDA allocated to the transmitting and receiving branches S, E), as well as the cycle signals SCL from/to the Opto-couplers 2a, 2b (i.e. the cycle signals SCL allocated to the transmitting and receiving branch S, E), are in each case applied separately to two differential bus drivers 4, 6 comprising transmitters 4a, 6a and receivers 4b, 6b.

Each receiver 4b and 6b of the differential bus drivers 4, 6 always monitors the signals on the I²C bus. The transmitters 4a and 6a are however only actively switched by way of a release logic 7a and 8a respectively when a "0" is transmitted from SDA, (i.e. the transmitters 4a and 6a, during transmission, are respectively switched on and off). For this, the signal SDA and the cycle signal SCL in the transmitting branches S are led from the Opto-coupler via a respective inverting member 3 and 5, respectively, to the release logic 7a and 8a, respectively, of the differential bus driver component 4 and 6 respectively. This means that the inverting members 3 and 5 merely ensure that the bus driver components 4 and 6 respectively are started or stopped. The respective data entrances D of the transmitters 4a, 6a are always kept fixed at ground.

The differential bus driver components 4, 6 convert the I²C bus signals SDA and SCL into physical differential signal levels SDA+, SDA− and SCL+ and SCL− respectively. The signal lines SDA+, SDA− and SCL+, SCL− are connected with resistors R1, R2 and R3, R4 respectively, whose values are the respective characteristic impedances, and also to the ends of the differential bus leads lying at the interface. The resistances R1 and R4 determine the level of SDA+, SDA− and SCL+, SCL− respectively, while the transmitter is deactivated.

In the receiving branches E no inversion is necessary nor is desired, since indeed the signal arriving at the receiving point should be read unchanged, (i.e. not inverted).

The second apparatus B contains an exactly identical interface circuit arrangement as that described herein for the first apparatus A.

The above details show that the interface circuit according to the invention 5 is suitable for an error-free transmission of data or control signals between distanced apparatuses of micro-surgery. In particular the interface circuit according to the invention is suitable for two apparatuses of a TEM insufflation system, which are separated from one another, since the apparatuses separated from one another are galvanically separated and the transmission between the apparatuses may be effected in a error-free manner by the differential bus driver components and the data signal leads SDA+, SDA− and cycle signal leads SCL+, SCL− which are connected to the bus-driver components. The transmission frequency as well as the known protocols for the data exchange via an I²C bus remain intact.

What is claimed is:

1. An interface circuit for connecting a first apparatus to at least one second apparatus distant therefrom by way of a bi-directional bus, in particular an I²C bus, the interface circuit having a data lead for the bi-directional transmission of a data signal and a cycle lead for the bi-directional transmission of a cycle signal, wherein the interface circuit consists of a circuit arrangement provided at each apparatus, the circuit arrangement comprising a separating means for separating the data signal at the data lead and the cycle signal at the cycle lead in each case into a transmitting branch and a receiving branch, wherein the separating means for the data lead and the cycle lead in each case comprises an Opto-coupler for the transmitting branch and the receiving branch for the galvanic separation of each transmitting branch and each receiving branch, and a bus driver having a differential transmitter and a differential receiver provided in each case for the data lead and the cycle lead, wherein data signals and cycle signals between the apparatuses are transmitted via differential leads.

2. An interface circuit for connecting a first apparatus to at least one second apparatus distant therefrom by way of a bi-directional bus, in particular an I²C bus, the interface circuit having a data lead for the bi-directional transmission of a data signal and a cycle lead for the bi-directional transmission of a cycle signal, wherein the interface circuit consists of a circuit arrangement provided at each apparatus, the circuit arrangement comprising a separating means for separating the data signal at the data lead and the cycle signal at the cycle lead in each case into a transmitting branch and a receiving branch, and a bus driver having a differential transmitter and a differential receiver provided in each case for the data lead and the cycle lead, wherein data signals and cycle signals between the apparatuses are transmitted via differential leads, wherein an Opto-coupler in each case of the transmitting branch and the receiving branch of the separating means are decoupled by diodes such that the receiving branch may only be active when a "1" has been transmitted or not transmitted, but a "0" has been received.

3. An interface circuit for connecting a first apparatus to at least one second apparatus distant therefrom by way of a bi-directional bus, in particular an I$^2$C bus, the interface circuit having a data lead for the bi-directional transmission of a data signal and a cycle lead for the bi-directional transmission of a cycle signal, wherein the interface circuit consists of a circuit arrangement provided at each apparatus, the circuit arrangement comprising a separating means for separating the data signal at the data lead and the cycle signal at the cycle lead in each case into a transmitting branch and a receiving branch, wherein the separating means for the data lead and the cycle lead in each case comprises an Opto-coupler for the transmitting branch and the receiving branch for the galvanic separation of each transmitting branch and each receiving branch, and a bus driver having a differential transmitter and a differential receiver provided in each case for the data lead and the cycle lead, wherein data signals and cycle signals between the apparatuses are transmitted via differential leads, wherein the Opto-coupler in each case of the transmitting branch and the receiving branch of the separating means are decoupled by diodes such that the receiving branch may only be active when a "1" has been transmitted or not transmitted, but a "0" has been received.

* * * * *